United States Patent
Tamaoki et al.

(10) Patent No.: US 7,982,945 B2
(45) Date of Patent: Jul. 19, 2011

(54) OPTICAL AMPLIFICATION MODULE AND LASER LIGHT SOURCE DESIGNED TO SUPPRESS PHOTODARKENING

(75) Inventors: Shinobu Tamaoki, Yokohama (JP); Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/423,097

(22) Filed: Apr. 14, 2009

(65) Prior Publication Data

US 2009/0201574 A1 Aug. 13, 2009

Related U.S. Application Data

(62) Division of application No. 11/443,456, filed on May 31, 2006, now Pat. No. 7,532,391.

(60) Provisional application No. 60/780,074, filed on Mar. 8, 2006.

(30) Foreign Application Priority Data

Jan. 20, 2006 (JP) ................. P2006-012998

(51) Int. Cl.
*H04B 10/17* (2006.01)

(52) U.S. Cl. ............... 359/341.1; 359/337.4; 359/341.5; 372/6

(58) Field of Classification Search ............... 359/337.4, 359/341.1, 341.5; 372/6
See application file for complete search history.

(56) References Cited

U.S. PATENT DOCUMENTS

| | | | |
|---|---|---|---|
| 5,532,870 A | 7/1996 | Shigematsu et al. | |
| 5,710,786 A | * 1/1998 | Mackechnie et al. | ............. 372/6 |
| 5,731,892 A | * 3/1998 | DiGiovanni et al. | ...... 359/337.4 |
| 5,880,877 A | 3/1999 | Fermann et al. | |
| 6,636,347 B1 | 10/2003 | Wang et al. | |
| 2002/0033998 A1 | 3/2002 | Kakui et al. | |

(Continued)

FOREIGN PATENT DOCUMENTS

GB 2395353 A 5/2004

(Continued)

OTHER PUBLICATIONS

J.J. Koponen, et al., "Photodarkening in ytterbium-doped silica fibers," SPIE Seciruty & Defense Europe '05 Symposium, 2005, Society of Photo-Optical Instrumentation Engineers.

(Continued)

*Primary Examiner* — Eric Bolda
(74) *Attorney, Agent, or Firm* — McDermott Will & Emery LLP

(57) ABSTRACT

The present invention relates to an optical amplification module having a construction which effectively suppresses photodarkening, and to a laser light source including the same. The laser light source comprises a light source for outputting light to be amplified, and an optical amplification module. The optical amplification module comprises two types of optical amplification media having different rare earth element concentrations, and a pumping light source. The low concentration medium and the high concentration medium are disposed in the propagation direction of pumping light such that the population inversion of the low concentration medium is higher than that of the high concentration medium. Hence, by arranging two types of optical amplification media with different rare earth concentrations such that the population inversion of the low concentration medium is higher than that of the high concentration medium, sufficient overall gain of the laser light source can be obtained while effectively suppressing photodarkening in the two types of optical amplification media.

7 Claims, 10 Drawing Sheets

U.S. PATENT DOCUMENTS

| | | | |
|---|---|---|---|
| 2002/0044342 A1* | 4/2002 | Krummrich | 359/337 |
| 2004/0085622 A1* | 5/2004 | Liu et al. | 359/341.1 |
| 2005/0201427 A1 | 9/2005 | Luo et al. | |
| 2007/0053400 A1 | 3/2007 | Sinha et al. | |

FOREIGN PATENT DOCUMENTS

| | | |
|---|---|---|
| JP | 05-003356 | 1/1993 |
| JP | 07-147445 | 6/1995 |
| JP | 2000-031571 | 1/2000 |
| JP | 2001-320117 | 11/2001 |
| JP | 2002-261366 | 9/2002 |
| JP | 2003-046165 | 2/2003 |

OTHER PUBLICATIONS

Joona Koponen, et al., "Measuring photodarkening from Yb-doped fibers," CLEO Europe, 2005.

Japanese Notice of Reasons for Rejection, w/ English translation thereof, issued in Japanese Patent Application No. JP 2006-012998 dated Feb. 1, 2011.

* cited by examiner

OPTICAL AMPLIFICATION MODULE AND LASER LIGHT SOURCE DESIGNED TO SUPPRESS PHOTODARKENING

CROSS-REFERENCE TO RELATED APPLICATION

This application is a divisional of U.S. patent application Ser. No. 11/443,456, filed May 31, 2006, now U.S. Pat. No. 7,532,391 claiming priority to Provisional Application Ser. No. 60/780,074, filed on Mar. 8, 2006 and Japanese Patent Application No. 2006-012998, filed Jan. 20, 2006 the entire contents of each of which are hereby incorporated by reference.

BACKGROUND OF THE INVENTION

1. Field of the Invention

The present invention relates to an optical amplification module which amplifies light in an optical amplification medium, and to a laser light source including the optical amplification module.

2. Related Background Art

At present, processing technology using laser beams is attracting much attention, and demand for laser light sources is increasing in various fields such as machining and medical treatment. In particular, among these laser light sources, a fiber laser light source has been attracting special attention. This fiber laser source comprises an optical fiber which is doped with various rare earth elements such as Yb, Er and Tm as an optical amplification medium, and therefore the fiber laser can amplify light to be amplified by supplying pumping light to the optical amplification medium and can produce a laser oscillation by a resonator structure. The advantages of the fiber laser source are that, since the laser beam is enclosed within the optical fiber, treatment is easy, and since heat radiation properties are good, a large-scale cooling installation is not required.

[Non-Patent Document 1] CLEO/Europe Conference '05, No. CP2-2-THU, 2005

SUMMARY OF THE INVENTION

The inventors have studied conventional laser light sources in detail, and as a result, have found problems as follows.

Namely, in a conventional laser light source, high power light is generated within an optical fiber. The generation of high power light damages the dopants and impurities in the optical fiber, and this leads to increasing loss of the optical fiber itself. This phenomenon is called photodarkening, and is due to the fact that the rare earth element, in the optical amplification medium which have a high population inversion, is damaged by the high power light. With a fiber having a high rare earth doping concentration, photodarkening tends to occur relatively easily.

In order to overcome the above-mentioned problems, it is an object of the present invention to provide an optical amplification module having a suitable construction for effectively suppressing photodarkening, and a laser light source including the same.

In an optical amplification module according to the present invention, there are provided two types of optical amplification media with different rare earth element concentrations, these being disposed such that the population inversion of the medium having a low rare earth element concentration is higher than that of the medium having a high rare earth element concentration. Hence, sufficient amplification of the laser light source can be obtained overall while photodarkening of the two types of optical amplification medium is effectively suppressed. More specifically, the optical amplification module according to the present invention comprises first and second optical amplification media that differ in doped rare earth element concentration, a first pumping light source, and a first optical multiplexer.

The first optical amplification medium has an optical waveguide region which is doped with a rare earth element in a predetermined concentration. The first optical amplification medium has a light entrance end into which light enters, and a light exit end which emits a first amplified light that has been amplified inside the first optical amplification medium. On the other hand, the second optical amplification medium has an optical waveguide region which is doped with a rare earth element in a higher concentration than the rare earth concentration of the first optical amplification medium, and is connected to this first optical amplification medium. The second optical amplification medium has a light entrance end into which the first amplified light enters, and a light exit end which emits a second amplified light that has been amplified inside the second optical amplification medium. The first pumping light source outputs a first pumping light of a predetermined wavelength. The first optical amplification medium and the second optical amplification medium may be connected together directly by fusion-splicing, or they may be optically connected via optical components such as an isolator and a band pass filter. The first optical multiplexer multiplexes the light to be amplified together with the first pumping light. The first optical multiplexer is disposed on the light entrance end side of the first optical amplification medium such that the first pumping light propagates I the order from the first optical amplification medium to the second optical amplification medium. A first pumping section is constituted by the first pumping light source and the first optical multiplexer.

In the optical amplification module having the aforesaid construction, the first pumping light outputted from the first pumping light source first propagates through the first optical amplification medium, and then through the second optical amplification medium. The incident light is amplified in the first optical amplification medium, and a first amplified light is emitted from the first optical amplification medium. This first amplified light is further amplified in the second optical amplification medium, and a second amplified light is emitted from the second optical amplification medium. In the first optical amplification medium into which the first pumping light is introduced, although the power of the first pumping light is relatively high, the rare earth element concentration is relatively low. However, in the second optical amplification medium through which the first pumping light subsequently propagates, although the rare earth element concentration is relatively high, the power of the first pumping light becomes relatively low. This construction makes it possible to increase the population inversion of the first optical amplification medium with a low rare earth element concentration, while at the same time suppressing the population inversion of the second optical amplification medium with a high rare earth element concentration. Therefore, in both the first optical amplification medium and second optical amplification medium, a high amplification gain can be obtained while photodarkening is suppressed.

In the optical amplification module according to the present inventions the population inversion in the first optical amplification medium is preferably 40% or more, and the rare earth element concentration in the first optical amplification medium is preferably not greater than half of the rare earth element concentration in the second optical amplification medium. The unsaturated absorption of the first optical amplification medium is preferably not less than 60% of the unsaturated absorption of the second optical amplification medium. The population inversion at the light entrance end of the second optical amplification medium is preferably less than 40%. Also, in the optical waveguide region of each of the first and second optical amplification media, in order to reduce the rare earth element concentration, a trivalent cation other than a rare earth element is preferably contained. In these cases, photodarkening can be still more effectively suppressed.

In the optical amplification module according to the present invention, the first optical amplification medium preferably has a core, an inner cladding provided on an outer periphery of the core region, and an outer cladding provided on an outer periphery of the inner cladding. The core region allows a single mode propagation of the light to be amplified entering it. The inner cladding allows a multi-mode propagation of the first pumping light outputted from the first pumping section. The second optical amplification medium preferably has a core region, an inner cladding provided on an outer periphery of the core region, and an outer cladding provided on an outer periphery of the inner cladding. The core region allows a single mode propagation of the first amplified light entering it. The inner cladding allows a multi-mode propagation of the first pumping light having passed through the first optical amplification medium. The doping concentration of the rare earth element in each of the first and second optical amplification media, is preferably 2000 wt.ppm or more. In these cases, still higher amplification gain is obtained while suppressing photodarkening.

Furthermore, the optical amplification module according to the present invention may comprises a plurality of optical amplification units each having an pumping light source, an optical multiplexer and an optical amplification medium. In this case, the optical amplification units may be directly connected together by fusion-splicing, or they may be optically connected via optical components such as an isolator and a band pass filter. More specifically, the optical amplification module according to the present invention comprises, at least, a first optical amplification unit and second optical amplification unit.

The first optical amplification unit amplifies light which enters it, and emits a first amplified light. The first optical amplification unit specifically comprises a first optical amplification medium, a first pumping light source and a first optical multiplexer. The first optical amplification medium has an optical waveguide region which is doped with a rare earth element. The first optical amplification medium has a light entrance end into which light enters, and a light exit end which emits a first amplified light that has been amplified inside the first optical amplification medium. The first pumping light source outputs a first pumping light of a predetermined wavelength. The first optical multiplexer multiplexes the light to be amplified together with the first pumping light. The first optical multiplexer is disposed on the light entrance end side of the first optical amplification medium such that the first pumping light propagates in the order from the first optical amplification medium to second optical amplification medium. The second optical amplification unit further amplifies the first amplified light emitted from the first optical amplification unit, and emits a second amplified light. The second optical amplification unit specifically comprises a second optical amplification medium, a second pumping light source and a second optical multiplexer. The second optical amplification medium has an optical waveguide region which is doped with a rare earth element in a higher concentration than the rare earth element concentration of the first optical amplification medium. The second optical amplification medium has a light entrance end into which the first amplified light enters, and a light exit end which emits the second amplified light that has been amplified inside the second optical amplification medium. The second pumping light source outputs a second pumping light with a wavelength different from that of the first pumping light. The second optical multiplexer multiplexes the first amplified light emitted from the first optical amplification medium and the first pumping light, together with the second pumping light. The second optical multiplexer is disposed between the first optical amplification medium and the second optical amplification medium.

As described above, in the case that the optical amplification module is constituted by the plurality of optical amplification units, the wavelength of the first pumping light is preferably included in the 915 nm wavelength band or 940 nm wavelength band. On the other hand, the wavelength of the second pumping light is preferably included in the 974 nm wavelength band. In this specification, the pumping light in the 915 nm wavelength band means light having a wavelength range of 120 nm centered on a wavelength of 915 nm. The pumping light in the 940 nm wavelength band means light having a wavelength range of ±20 nm centered on a wavelength of 940 nm. Further, the pumping light in the 974 nm wavelength band means light having a wavelength range of +5 nm centered on a wavelength of 974 nm.

In addition to the first and second optical amplification units, the optical module according to the present invention may comprise a third optical amplification unit. In this case, the third optical amplification unit further amplifies the second amplified light emitted from the second optical amplification unit, and emits a third amplified light. The third optical amplification unit specifically comprises a third optical amplification medium, a third pumping light source and a third optical multiplexer. The third optical amplification medium has an optical waveguide region which is doped with a rare earth element in a higher concentration than the rare earth element concentration of the first optical amplification medium. The third optical amplification medium has a light entrance end into which the second amplified light enters, and a light exit end which emits the third amplified light that has been amplified inside the third optical amplification medium. The third pumping light source outputs a third pumping light with a wavelength different from that of the first pumping light. The third optical multiplexer multiplexes the third pumping light together with the second amplified light emitted from the second optical amplification medium, the first pumping light and the second pumping light. The third optical multiplexer is disposed between the second optical amplification medium and the third optical amplification medium.

This third optical amplification unit has a substantially identical construction to that of the aforesaid second optical amplification unit. Therefore, the wavelength of the third pumping light is included in the 974 nm wavelength band.

The laser light source according to the present invention comprises a light source for outputting light to be amplified, and an optical amplification module having the aforesaid construction which amplifies the light outputted from the light source. In this laser light source, the light outputted from the light source is amplified in the optical amplification module, and the amplified light is outputted.

The invention will be more fully understood from the detailed description given hereinbelow and the accompanying drawings, which are given by way of illustration only and are not to be considered as limiting the present invention.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of an optical amplification module and laser light source according to the present invention will be explained in detail with reference to FIGS. 1 to 10. In the explanation of the drawings, constituents identical to each other will be referred to with numerals identical to each other without repeating their overlapping descriptions.

First Embodiment

Figure 1:
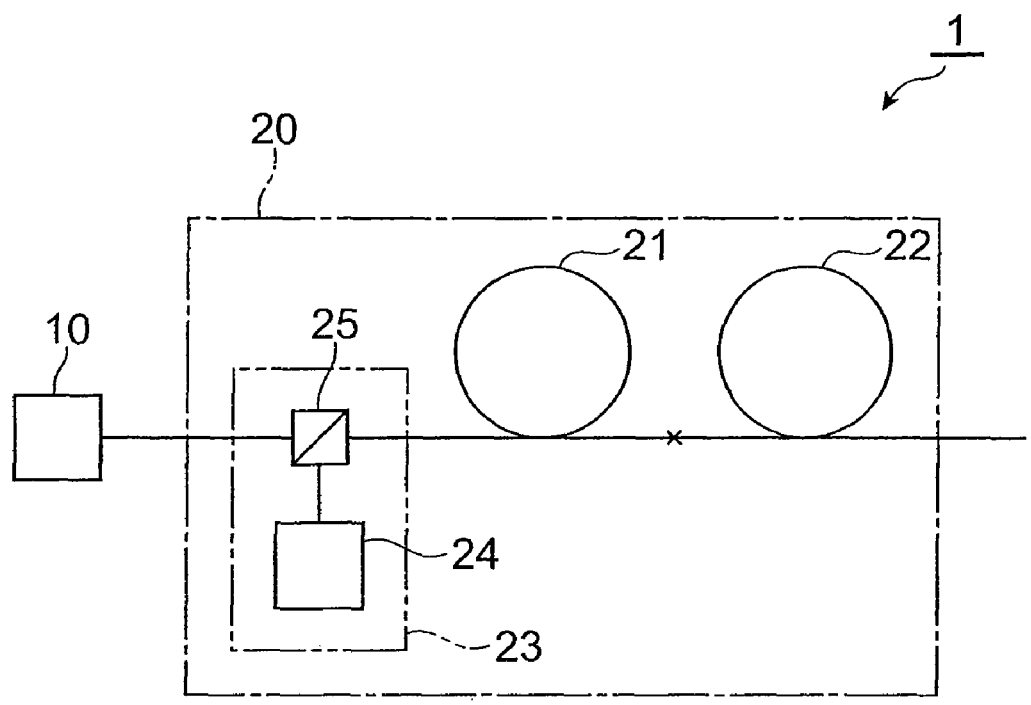
FIG. 1 is a diagram showing a constriction of a first embodiment of a laser light source according to the present invention (including an optical amplification module according to the present invention)

FIG. 1 is a drawing showing the construction of a first embodiment of a laser light source according to the present invention. A laser light source 1 shown in FIG. 1 comprises a light source 10 and an optical amplification module 20 (optical amplification module according to the present invention). In the laser light source 1, the light from the light source 10 is amplified in the optical amplification module 20, and the obtained amplified light is emitted.

The optical amplification module 20 comprises a first optical amplification medium 21, a second optical amplification medium 22 and a pumping section 23. Each of the first optical amplification medium 21 and the second optical amplification medium 22 is an optical waveguide whose optical waveguide region is doped with a rare earth element, and is preferably an optical fiber having a core region doped with Yb as a rare earth element. One end of the first optical amplification medium 21 and the second optical amplification medium 22, respectively, are optically connected, and preferably fusion-spliced. The rare earth element concentration of the second optical amplification medium 22 is higher than the rare earth element concentration of the first optical amplification medium 21.

The pumping section 23 includes a pumping light source 24 and an optical coupler (optical multiplexer) 25. The pumping light source 24 outputs a wavelength which can pump the rare earth element included in each of the first optical amplification medium 21 and the second optical amplification medium 22. The pumping light source 24 is preferably, for example, a laser diode or the like. The optical coupler 25 outputs the light to be amplified from the light source 10 to the first optical amplification medium 21, and also outputs the pumping light inputted from the pumping light source 24 to the first optical amplification medium 21.

In this optical amplification module 20, the pumping light outputted from the pumping light source 24 passes through the optical coupler 25, and then propagates in the order from the first optical amplification medium 21 to second optical amplification medium 22. The light to be amplified from the light source 10 is also inputted into the optical amplification module 20, and after passing through the optical coupler 25, is amplified in the first optical amplification medium 21 and the optical amplification medium 22, respectively. The obtained amplified light is outputted from the optical amplification module 20.

As described above, in this first embodiment, the pumping light outputted from the pumping section 23 first propagates through the first optical amplification medium 21, and then propagates through the second optical amplification medium 22. In the first optical amplification medium 21 through which the pumping light propagates first, although the power of the pumping light which propagates therethrough is relatively high, the rare earth element concentration is relatively low. On the other hand, in the second optical amplification medium 22 through which the pumping light propagates next, although the rare earth element concentration is relatively high, the power of the pumping light which propagates therethrough is relatively low. Due to this, the population inversion of the first optical amplification medium with a low rare earth element concentration can be increased, while the population inversion of the second optical amplification medium with a high rare earth element concentration can be decreased. Therefore, in both the first optical amplification medium 21 and the second optical amplification medium 22, a high amplification gain can be obtained while photodarkening is suppressed.

The population inversion in the first optical amplification medium 21 is preferably 40% or more, and the rare earth element concentration in the first optical amplification medium 21 is preferably not greater than half of the rare earth element concentration in the second optical amplification medium 22. The unsaturated absorption of the first optical amplification medium 21 is preferably not less than 60% of the unsaturated absorption of the second optical amplification medium 22. The population inversion at the light entrance end of the second optical amplification medium 22 (end face of the second optical amplification medium 22 fusion-spliced to the light exit end of the first optical amplification medium 21), is preferably less than 40%. Also, in order to reduce the rare earth element concentration, a trivalent cation other than a rare earth element, such as $Al^{3+}$ or the like, is preferably also added to the optical waveguide region of each of the first optical amplification medium 21 and the second optical amplification medium 22. In these cases, photodarkening may be suppressed still more effectively.

Figure 2:
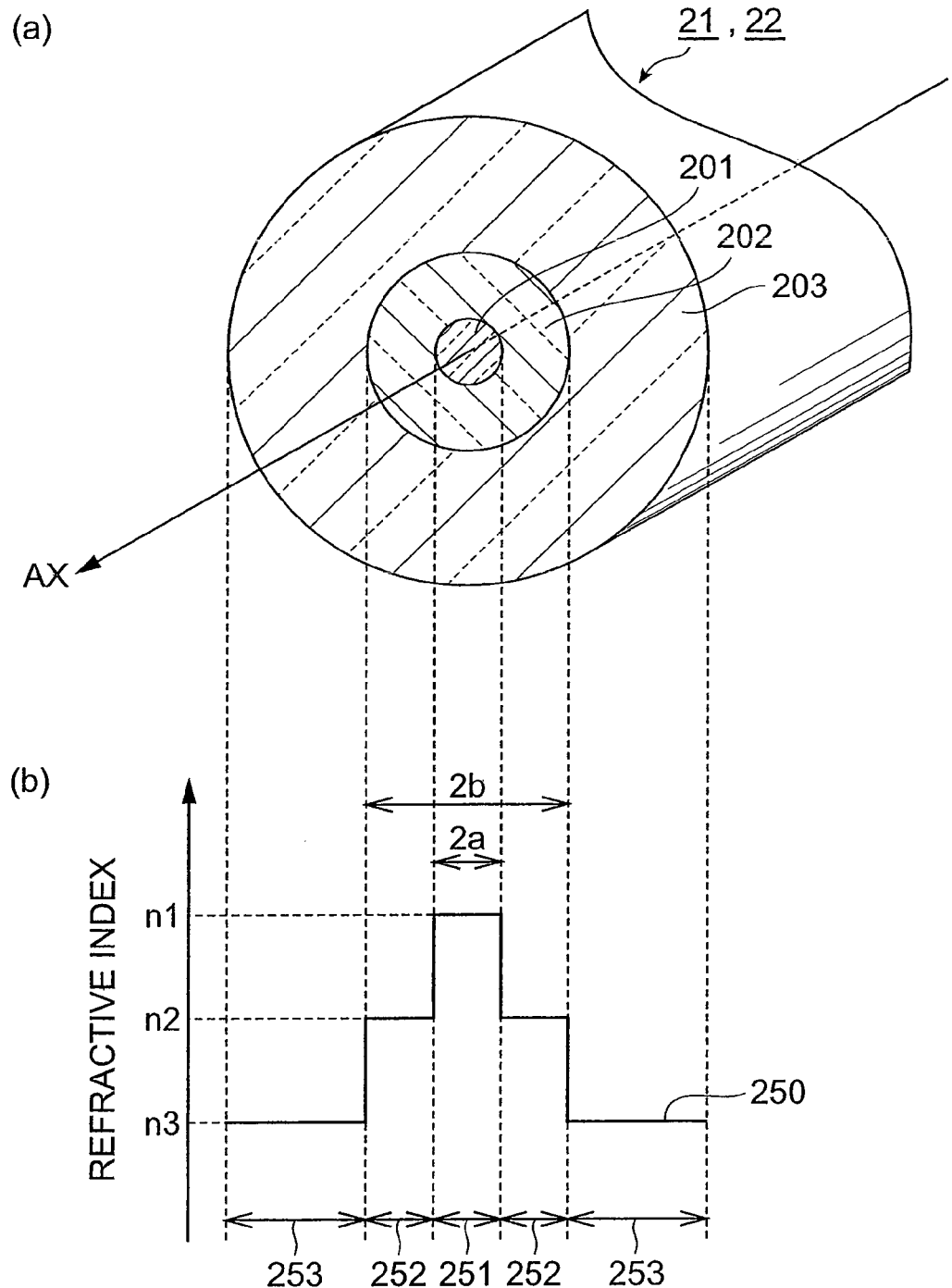
FIG. 2 is a cross-sectional diagram showing the construction of each of a first optical amplification medium and second optical amplification medium which can be used in the optical amplification module according to the present invention, and a refractive index profile thereof.

FIG. 2 is a cross-sectional view showing the construction of each of the first optical amplification medium 21 and the second optical amplification medium 22, and a refractive index profile thereof. The area (a) of FIG. 2 shows a cross-section which intersects perpendicularly with the optical axis AX, and the area (b) is a refractive index profile in the radial direction which intersects perpendicularly with this optical axis AX. As shown in the area (a), preferably, each of the first optical amplification medium 21 and second optical amplification medium 22 has a core 201 allowing a single mode propagation of light to be amplified and doped with a rare earth element, an inner cladding 202 provided on an outer periphery of the core 201 and allowing a multi-mode propagation of the pumping light, and an outer cladding 203 provided on an outer periphery of the inner cladding 202. The core 201 has a refractive index n1, the inner cladding 202 has a refractive index n2 lower than that of the core 201, and the outer cladding 203 has a refractive index n3 lower than that of the inner cladding 202. The rare earth element concentration of each of the first optical amplification medium 21 and the second optical amplification medium 22 is preferably 2000 wt.ppm or more. In this case, photodarkening is suppressed, and the light to be amplified can be amplified with still higher gain. The trivalent cation other than a rare earth element, such as $Al^{3+}$ or the like, may also be added to the core 201.

In a refractive index profile 250 shown in the area (b) of FIG. 2, a region 251 indicates the refractive index in the radial direction of the core 201, a region 252 indicates the refractive index in the radial direction of the inner cladding 202, and a region 253 indicates the refractive index in the radial direction of the outer cladding 203.

Figure 3:
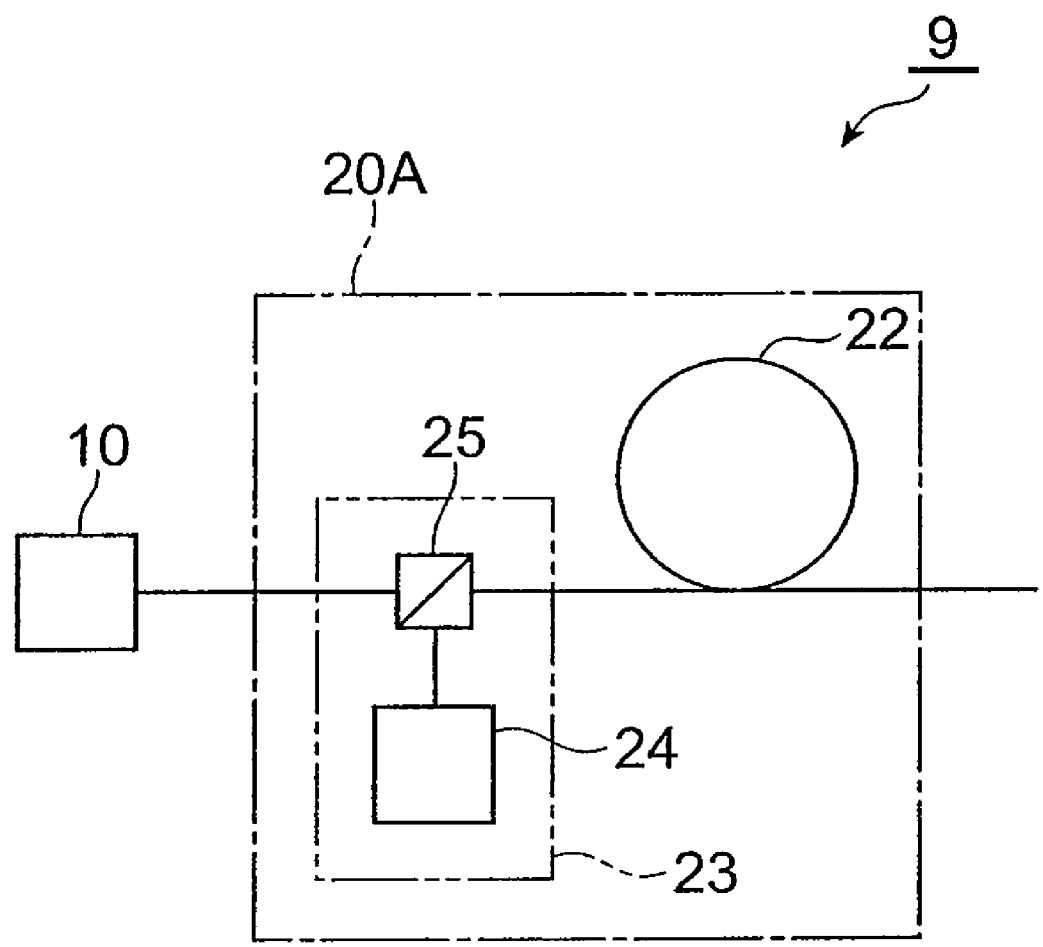
FIG. 3 is a diagram showing the construction of a laser light source according to a comparative example.

FIG. 3 is a diagram showing the construction of the laser light source according to a comparative example. A laser light source 9 according to the comparative example, shown in this FIG. 3, comprises the light source 10 for outputting light to be amplified, and an optical amplification module 20A. In the laser light source 9 according to the comparative example, the light to be amplified from the light source 10 is amplified in the optical amplification module 20A, and the obtained amplified light is emitted. The optical amplification module 20A has a construction wherein the first optical amplification medium 21 is omitted from the optical amplification module 20 (optical amplification module according to the present invention) used in the laser light source 1 of the aforesaid first embodiment.

Figure 4:
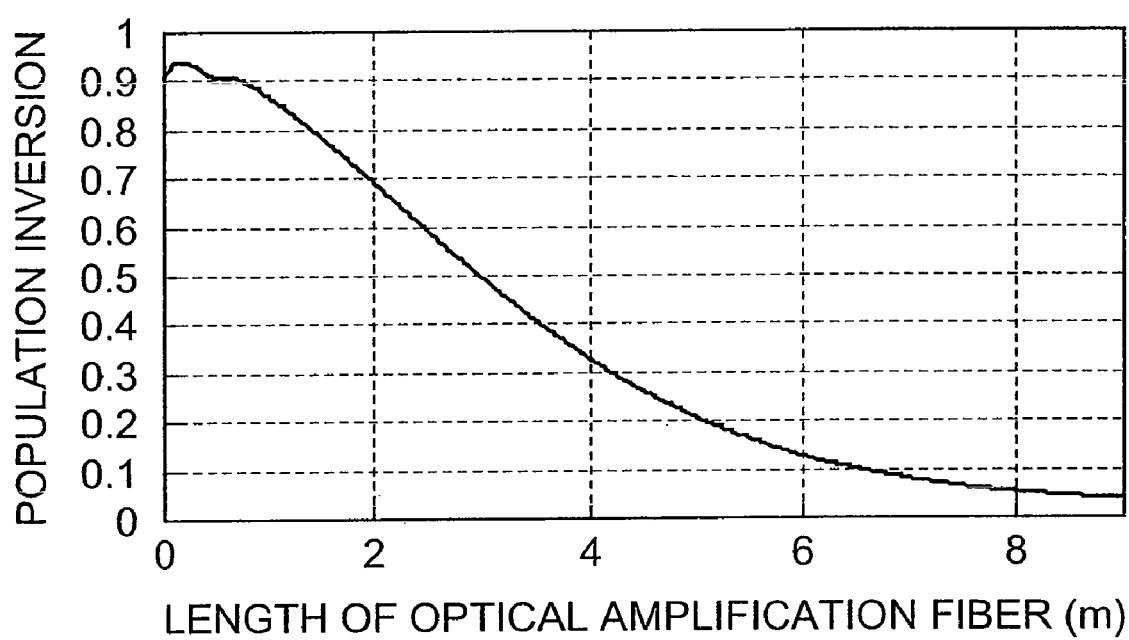
FIG. 4 is a graph showing the variation of population inversion in the longitudinal direction of an optical amplification medium included in the laser light source according to the comparative example.
Figure 5:
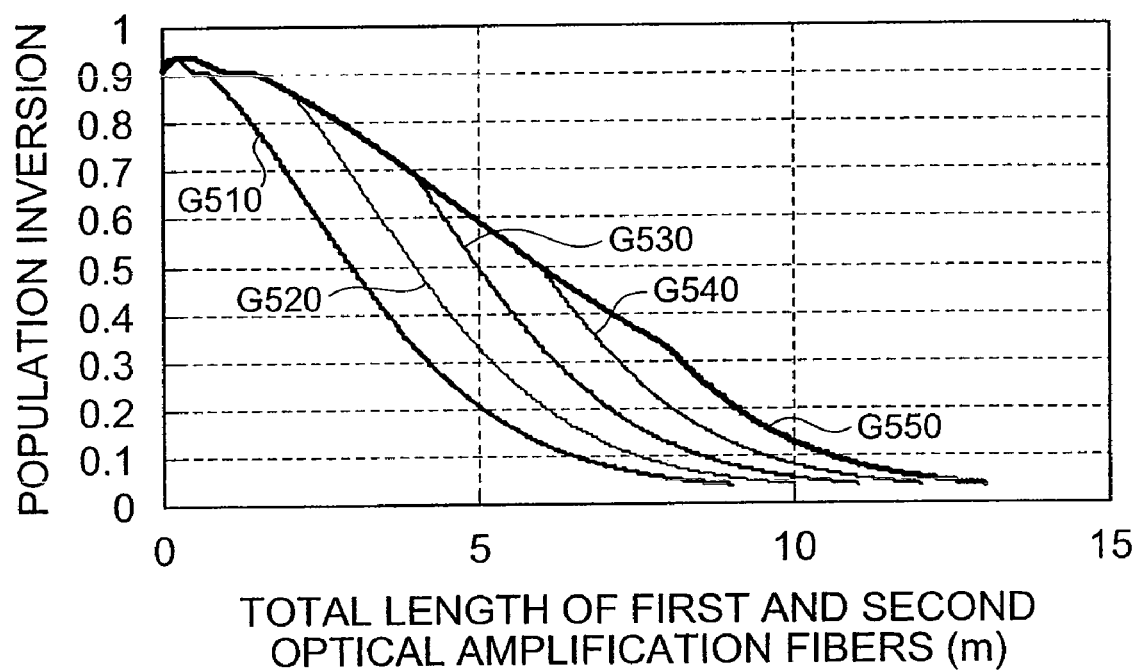
FIG. 5 is a graph showing the variation of population inversion in the longitudinal direction of the first optical amplification medium and second optical amplification medium used in the optical amplification module of the laser light source according to the first embodiment.

The action and effect of the laser light source 1 according to the first embodiment will now be described in comparison with the laser light source 9 according to the comparative example. The first optical amplification medium 21 and the second optical amplification medium 22 are both optical fibers each having the structure shown in FIG. 2, and the core 201 is doped with Yb as a rare earth element. The wavelength of the pumping light is 915 nm and the wavelength of the light to be amplified (seed beam) is 1064 nm. The Yb concentration of the second optical amplification medium 22 is 15000 wt.ppm. FIGS. 4 and 5 are graphs measured under such conditions.

FIG. 4 is a graph showing the variation of population inversion in the longitudinal direction of the optical amplification medium 22 in the laser light source 9 according to the comparative example. In FIG. 4, the horizontal axis represents the pumping light propagation distance from the optical coupler 25. As shown in this FIG. 4, the population inversion is higher the closer to the light entrance end of the optical amplification medium 22, and its degree of amplification is also larger. Therefore, in the laser light source 9 according to this comparative example, photodarkening tends to occur easily.

FIG. 5 is a graph showing the variation of population inversion in the longitudinal direction of the first optical amplification medium 21 and the second optical amplification medium 22 used in the laser light source 1 of the first embodiment. In FIG. 5, the horizontal axis represents the pumping light propagation distance from the optical coupler 25. In this measurement, the pumping light power is constant such that the same output power is obtained as in the aforesaid comparative example. The rare earth doping concentration and length L1 of the first optical amplification medium 21, and the length L2 of the second optical amplification medium 22, are adjusted such that the same unsaturated absorption is obtained as in the aforesaid comparative example. Also, the rare earth element concentration of the first optical amplification medium 21 is half of the rare earth element concentration of the second optical amplification medium 22 (i.e., the rare earth element concentration of the first optical amplification medium 21 is 7500 wt.ppm).

In FIG. 5, the curve G510 shows the population inversion when the total length of the first and second optical amplification media 21, 22 was varied and the length L2 of the second optical amplification medium 22 was fixed to 9 m, the curve G520 shows the population inversion when the total length of the first and second optical amplification media 21, 22 was varied and the length L2 of the second optical amplification medium 22 was fixed to 8 m, the curve G530 shows the population inversion when the total length of the first and second optical amplification media 21, 22 was varied and the length L2 of the second optical amplification medium 22 was fixed to 7 m, the curve G540 shows the population inversion when the total length of the first and second optical amplification media 21, 22 was varied and the length L2 of the second optical amplification medium 22 was fixed to 6 m, and the curve G550 shows the population inversion when the total length of the first and second optical amplification media 21, 22 was varied and the length L2 of the second optical amplification medium 22 was fixed to 5 m.

It can be seen that, when the length L2 of the second optical amplification medium 22 is 5 m to 6 m as shown in this FIG. 5, the population inversion at the pumping light entrance end of the second optical amplification medium 22 is about 40% to 50%, which is sufficiently low. Therefore, in the laser light source 1 according to the first embodiment, photodarkening can be suppressed.

Figure 6:
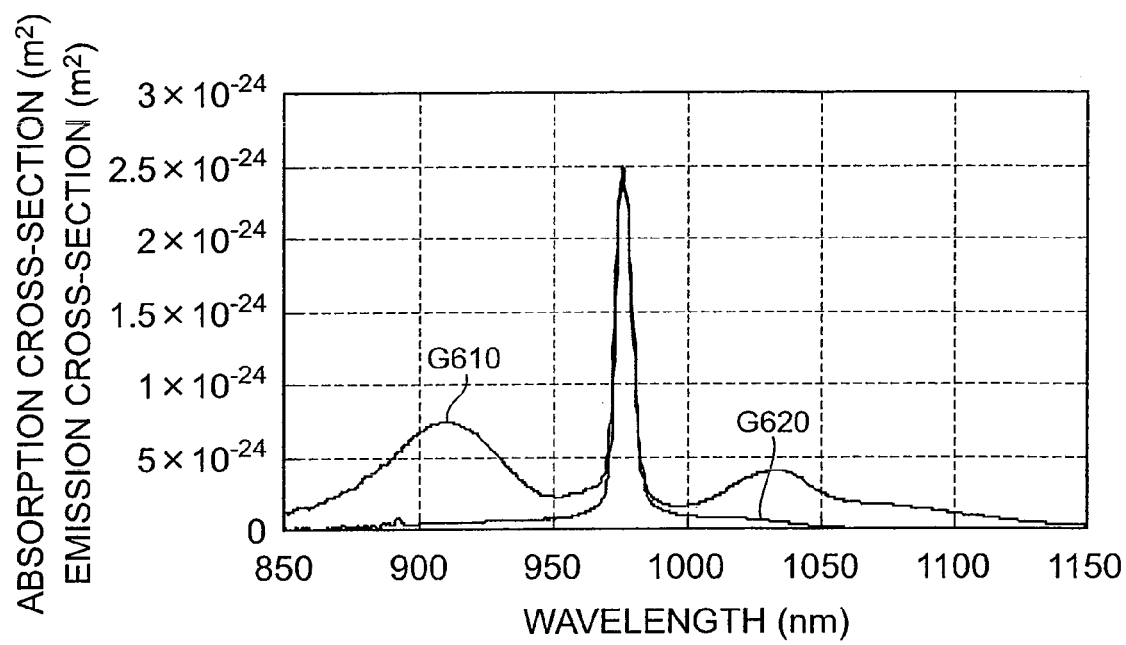
FIG. 6 is a graph showing the wavelength dependency of the absorption cross-section and emission cross-section in a Yb-doped fiber as an example of the first and second optical amplification media.

FIG. 6 is a graph showing the wavelength dependency of the absorption cross-section and emission cross-section in a Yb-doped fiber as an example of the first optical amplification medium 21 and second optical amplification medium 22. In FIG. 6, the curve G610 indicates an absorption cross-section ($m^2$) for light with a wavelength of 850 nm to 1150 nm, and the curve G620 indicates an emission cross-section ($m^2$) for light with a wavelength of 850 nm to 1150 nm. As can be seen from FIG. 6, all the curves have a peak near a wavelength of 974 nm. The Inventors therefore set the pumping light wavelength to 974 nm and the pumping light power to be the same as the aforesaid pumping light power, adjusted the length L1 of the first optical amplification medium 21 and the length L2 of the second optical amplification medium 22 to obtain the same output power as the aforesaid output power, and measured the relation between the length of the optical amplification media and the population inversion.

As a result, it was found that when only the second optical amplification medium 22 was used without using the first optical amplification medium 21 (as in the laser light source 9 of the comparative example), the length L2 of the second optical amplification medium 22 was about 6 m, which was sufficient. This is because in the optical amplification medium to which Yb was added, the absorption coefficient is larger at a wavelength of 974 nm than at a wavelength of 915 nm, so a shorter length is sufficient.

Figure 7:
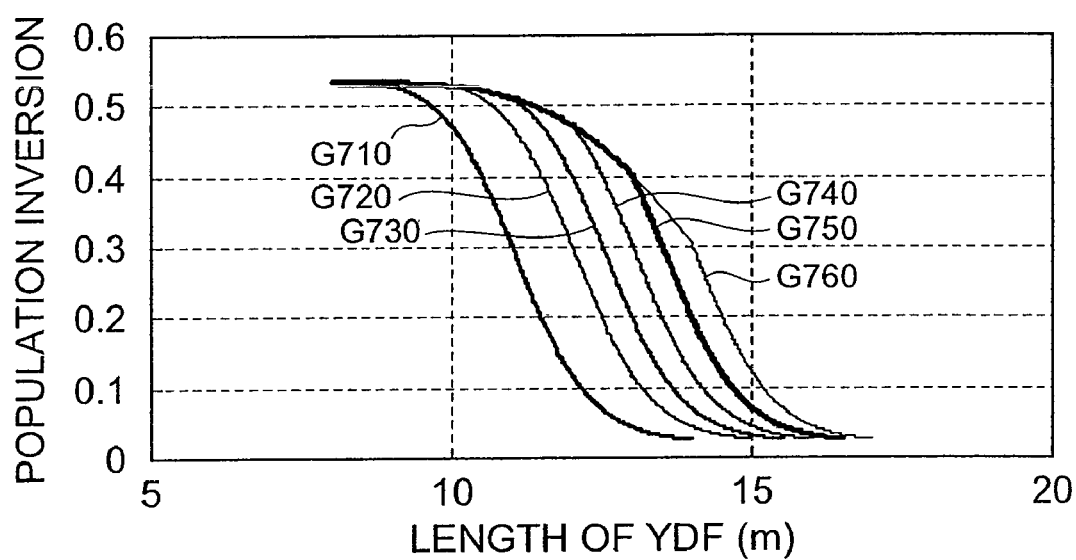
FIG. 7 is a graph showing the variation of population inversion in the longitudinal direction of the first optical amplification medium and second optical amplification medium used in the optical amplification module of the laser light source according to the first embodiment.

FIG. 7 shows a graph corresponding to variation of the population inversion in the longitudinal direction for the first optical amplification medium 21 and the second optical amplification medium 22 used in the laser light source 1 according to the first embodiment. In measuring this variation of population inversion, the pumping light wavelength was 974 nm and the first optical amplification medium 21 had a low concentration. Also, in this measurement, while adjusting the length of the first optical amplification medium 21 and second optical amplification medium 22, the total unsaturated absorption of the first optical amplification media 21 and second optical amplification medium 22 was adjusted. In FIG. 7, the curve G710 indicates the population inversion when the total length of the first and second optical amplification media 21, 22 was varied and the length L2 of the second optical amplification medium 22 was fixed to 6 m, the curve G720 indicates the population inversion when the total length of the first and second optical amplification media 21, 22 was varied and the length L2 of the second optical amplification medium 22 was fixed to 5 m, the curve G730 indicates the population inversion when the total length of the first and second optical amplification media 21, 22 was varied and the length L2 of the second optical amplification medium 22 was fixed to 4.5 m, the curve G740 indicates the population inversion when the total length of the first and second optical amplification media 21, 22 was varied and the length L2 of the second optical amplification medium 22 was fixed to 4 m, the curve G750 indicates the population inversion when the total length of the first and second optical amplification media 21, 22 was varied and the length L2 of the second optical amplification medium 22 was fixed to 3.5 m, and the curve G760 indicates the population inversion when the total length of the first and second optical amplification media 21, 22 was varied and the length L2 of the second optical amplification medium 22 was fixed to 3 m.

As a result, it can be seen that, when the length L2 of the second optical amplification medium 22 was 3.5 m and the total unsaturated absorption of the first optical amplification medium 21 and second optical amplification medium 22 was adjusted, the population inversion at the pumping light entrance end of the second optical amplification medium 22 was about 40% at a length of 3.5 m, which is sufficiently low. Hence, to suppress photodarkening, the use of pumping light having a wavelength of 974 nm decreases the population inversion, and is thus more effective.

Figure 8:
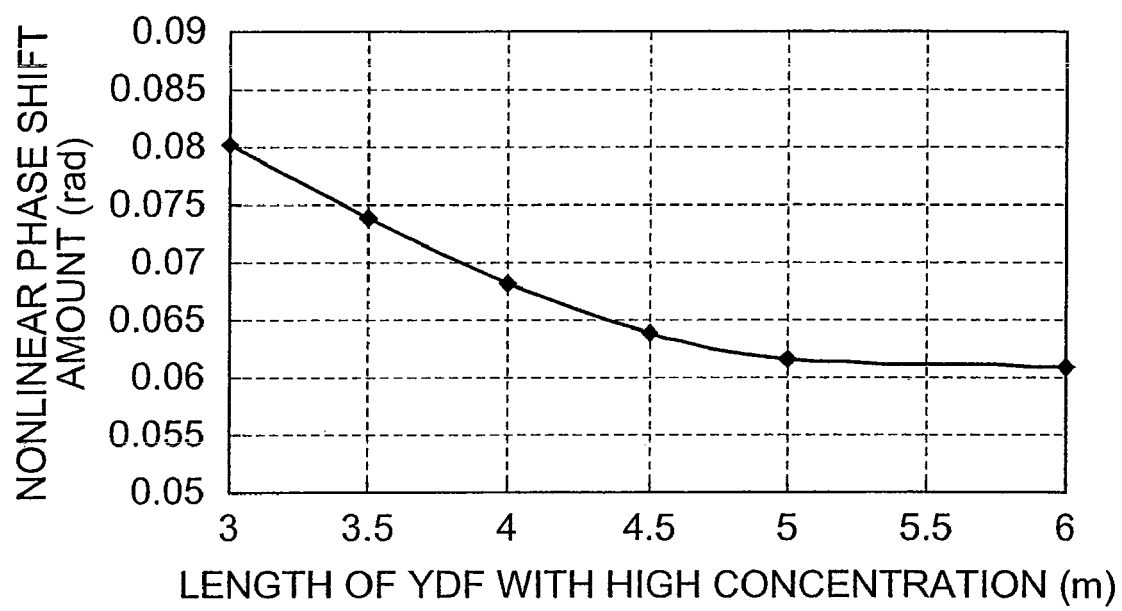
FIG. 8 is a graph showing the relation between a length and non-linear shift amount for the second optical amplification medium used in the optical amplification module of the laser light source according to the first embodiment.

In the optical amplification module 20 of the laser light source 1 according to this first embodiment, the low concentration of the first optical amplification medium 21 has an identical significance to the lengthening of the first and second optical amplification media 21, 22. Hence, in the first and second optical amplification media 21, 22, the nonlinear shift amount becomes large. FIG. 8 is a graph showing the relation of the length L2 of the second optical amplification medium used in the optical amplification module 20 of the laser light source 1 according to this first embodiment, and the nonlinear shift amount. When the wavelength of the pumping light is 974 nm and the length L2 of the second optical amplification medium 22 is 3.5 m, the nonlinear shift amount can be suppressed to about 1 dB or less than the nonlinear shift amount of the optical amplification medium (FIG. 3) in the comparative example. Since this value is determined to be within the limits of the loss variation at the fusion-spliced portion between the first optical amplification medium 21 and the second optical amplification medium 22, and the loss variation from the second optical amplification medium 22 to the output end of the laser light source 1, the increasing nonlinear shift amount due to use of the first optical amplification medium 21, is not a problem.

Second Embodiment

Figure 9:
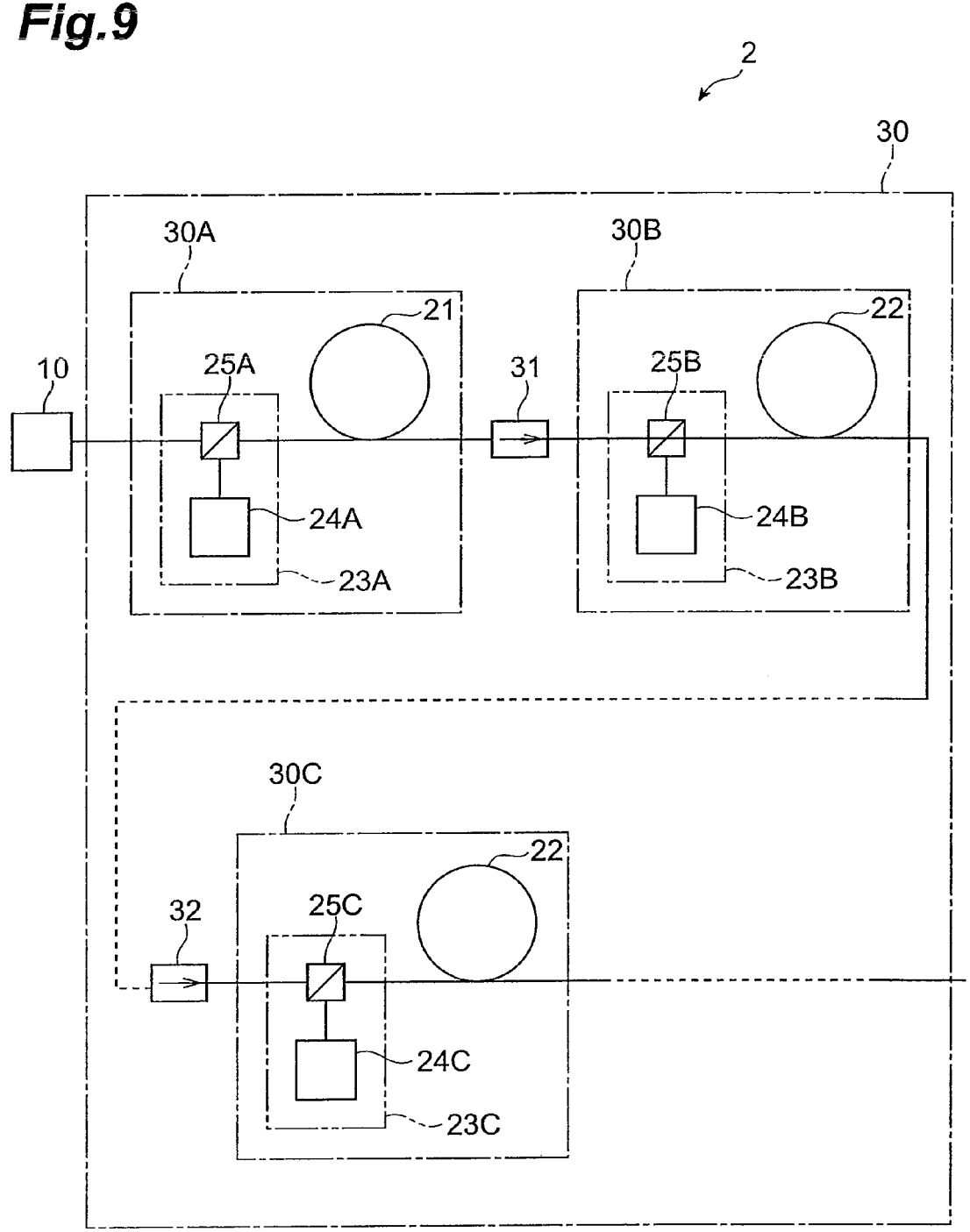
FIG. 9 is a drawing showing the construction of a second embodiment of a laser light source according to the present invention (including an optical amplification module according to the present invention comprising plural optical amplification units)

FIG. 9 is a drawing showing a construction of a second embodiment of the laser light source according to the present invention. A laser light source 2 according to the second embodiment shown in this FIG. 9 comprises the light source 10 for outputting light to be amplified, and an optical amplification module 30 (optical amplification module according to the present invention). In the laser light source 2, the light to be amplified from the light source 10 is amplified in the optical amplification module 30, and the obtained amplified light is outputted.

The optical amplification module 30 may comprise two or more optical amplification units, each comprising a pumping light source, an optical multiplexer and an optical amplification medium. In the laser light source 2 according to the second embodiment, the optical amplification module 30 comprises a first optical amplification unit 30A, a second optical amplification unit 30B and a third optical amplification unit 30C. The first to third optical amplification units 30A to 30C are optically connected via isolators 31, 32, but the light exit end of the optical amplification unit of the first stage and the light entrance end of the optical amplification unit of the last stage, may be directly fusion-spliced together.

The first optical amplification unit 30A comprises a first optical amplification medium 21 and a first pumping section 23A. The first optical amplification medium 21, as described above, is an optical waveguide whose optical waveguide region is doped with the rare earth element as described above, and is preferably an optical fiber whose core region is doped with Yb as a rare earth element.

The first pumping section 23A includes a first pumping light source 24A and a first optical coupler (optical multiplexer) 25A. The first pumping light source 24A outputs a first pumping light having a wavelength which can pump the rare earth elements added to the first optical amplification medium 21, specifically a wavelength in the 915 nm wavelength band or the 940 nm wavelength band. The pumping light in the 915 nm wavelength band means light having a wavelength range of ±20 nm centered on 915 nm. The pumping light in the 940 nm wavelength band means light having a wavelength range of ±20 nm centered on 940 nm. This first pumping light source 24A is preferably, for example, a laser diode or the like.

The first optical coupler 25A outputs the light to be amplified from the light source 10 to the first optical amplification medium 21, and also outputs the first pumping light inputted from the first pumping light source 24A to the first optical amplification medium 21.

In this first optical amplification unit 30A, the first pumping light outputted from the first pumping light source 24A propagates through the first optical amplification medium 21 via the first optical coupler 25A. The light to be amplified from the light source 10 is also inputted into the first optical amplification unit 30A, and the incident light to be amplified is amplified in the first optical amplification medium 21 after passing through the first optical coupler 25A. The obtained first amplified light from the first optical amplification unit 30A is outputted to the second optical amplification unit 30B.

The second optical amplification unit 30B comprises a second optical amplification medium 22 and a second pumping section 23B. The second optical amplification medium 22, as described above, is also an optical waveguide whose optical waveguide region is doped with a rare earth element, and is preferably, an optical fiber whose core region is doped with Yb as a rare earth element. However, the rare earth element concentration of this second optical amplification medium 22 is higher than the rare earth element concentration of the aforesaid first optical amplification medium 21.

The second pumping section 23B includes a second pumping light source 24B and a second optical coupler (optical multiplexer) 25B. The second pumping light source 24B outputs a second pumping light having a wavelength which can pump the rare earth element added to the second optical amplification medium 22, i.e., a wavelength of 974 nm. The pumping light in the 974 nm wavelength band means light having a wavelength range of ±5 nm centered on 974 nm. This second pumping light source 24B is preferably, for example, a laser diode or the like. The second optical coupler 25B outputs the first amplified light which arrived from the first optical amplification unit 30A via the isolator 31 to the second optical amplification medium 22, and also outputs the second pumping light inputted from the second pumping light source 24B to the second optical amplification medium 22.

In this second optical amplification unit 30B, the second pumping light outputted from the second pumping light source 24B propagates through the second optical amplification medium 22 via the second optical coupler 25B. The first amplified light which arrived from the first optical amplification unit 30A via the isolator 31 is also inputted into the second optical amplification unit 30B, and the first amplified light is amplified in the second optical amplification medium 22 after passing via the second optical coupler 25B. The obtained second amplified light is outputted from the second optical amplification unit 30B to the third optical amplification unit 30C.

The third optical amplification unit 30C disposed after the second optical amplification unit 30B has a substantially identical construction to that of the second optical amplification unit 30B. This third optical amplification unit 30C specifically comprises the second optical amplification medium 22 and a third pumping section 23C. The second optical amplification medium 22 used in this third optical amplification unit 30C is also an optical waveguide whose optical waveguide region is doped with a rare earth element as described above, and is preferably an optical fiber whose core region is doped with Yb as a rare earth element. However, the rare earth element concentration of this second optical amplification medium 22 is higher than the rare earth element concentration of the aforesaid first optical amplification medium 21.

The third pumping section 23C includes a third pumping light source 24C and a third optical coupler (optical multiplexer) 25C. As in the case of the second pumping light source 24B, the third pumping light source 24C outputs a third pumping light having a wavelength which can pump the rare earth elements added to the second optical amplification medium 22, i.e., a wavelength of 974 nm. This third pumping light source 24C is preferably, for example, a laser diode or the like. The third optical coupler 25C outputs the second amplified light which arrived from the second optical amplification unit 30B via the isolator 32 to the second optical amplification medium 22, and also outputs the third pumping light inputted from the third pumping light source 24C to the second optical amplification medium 22.

In the third optical amplification unit 30C, the third pumping light outputted from the third pumping light source 24C propagates through the second optical amplification medium 22 via the third optical coupler 25C. The second amplified light which arrived from the second optical amplification unit 30B via the isolator 32 is also inputted to the third optical amplification unit 30C, and the second amplified light is amplified in the second optical amplification medium 22 after passing through the third optical coupler 25C. The obtained third amplified light is outputted from the third optical amplification unit 30C as the final output of the laser light source 2 according to the second embodiment.

Figure 10:
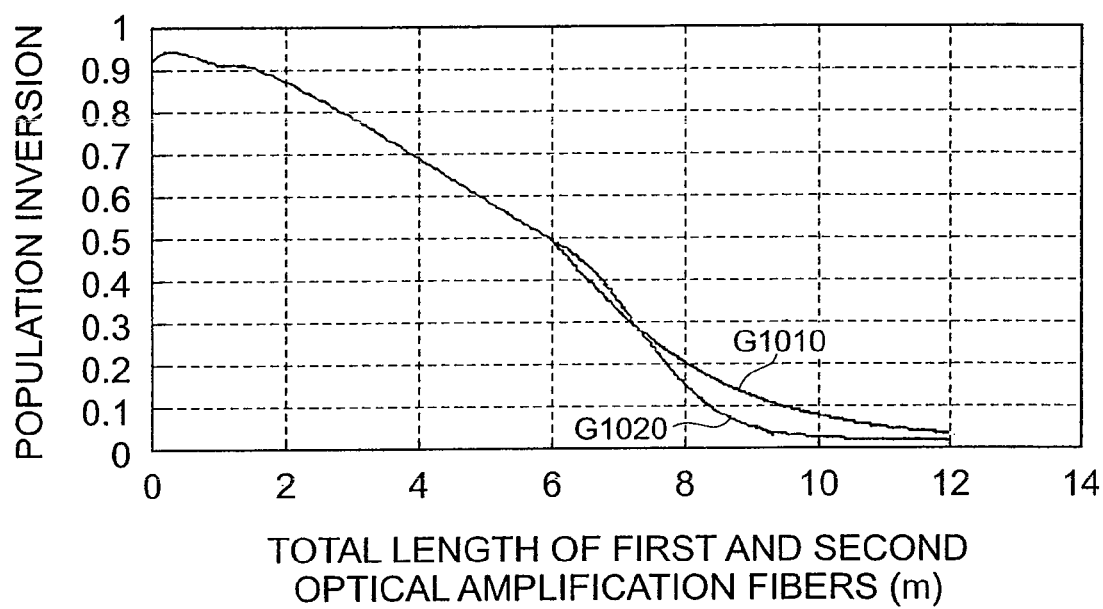
FIG. 10 is a graph comparatively describing the effects of the first embodiment and the second embodiment of the laser light source according to the present invention.

Next, referring to FIG. 10, the effect of the first embodiment and second embodiment using the laser light source according to the present invention will be explained. FIG. 10 is a graph for describing, in comparative terms, the effect of the first embodiment and second embodiment using the laser light source according to the present invention. In the laser light source 1 according to the first embodiment, the optical amplification module 20 has a one-stage construction wherein the first optical amplification medium 21 and the second optical amplification medium 22 are fusion-spliced together. On the other hand, in the laser light source 2 according to the second embodiment, the optical amplification module 30 has a two-stage construction comprising the first optical amplification unit 30A including the first optical amplification medium 21 and the second optical amplification unit 30B including the second optical amplification medium 22.

In the one-stage optical amplification module 20 of the first embodiment, light passing through the first and second optical amplification media 21, 22 is amplified by pumping light having a wavelength of 915 nm. The length of the first optical amplification medium 21 is 6 m, and the length of the second optical amplification medium 22 is 6 m. Also, the rare earth element concentration of the first optical amplification medium 21 is half that of the second optical amplification medium 22. On the other hand, the two-stage optical module 30 of the second embodiment comprises the first optical amplification unit 30A and second optical amplification unit 30B, and in the first optical amplification unit 30A of the first stage, the wavelength of the first pumping light is 915 nm and the length of the first optical amplification medium 21 is 6 m. In the second optical amplification unit 30B of the second stage, the wavelength of the second pumping light is 974 nm, and the length of the second optical amplification medium 22 is 6 m. In FIG. 10, the curve 1010 indicates the variation of the population inversion in the one-stage optical amplification module 20, and corresponds to the curve G540 in FIG. 5. Also, the curve G1020 indicates the variation of the population inversion in the two-stage optical amplification module 30.

As can be seen from FIG. 10, in the two-stage optical amplification module 30, although the population inversion at the pumping light entrance end of the first optical amplification medium 21 (in the first optical amplification unit 30A) is about 90%, the population inversion at the exit end of the first optical amplification medium 21 is about 50%. Next, the first amplified light (amplified light outputted from the first optical amplification unit 30A) which passed through the isolator 31 and second optical coupler 25B in that order propagates through the second optical amplification medium 22. By adjusting the second pumping light power which enters the second optical amplification medium 22, the population inversion of the second optical amplification medium 22 can be adjusted. In particular, in this measurement, the first pumping light power used in the first optical amplification unit 30A is 42.5 dB, and the second pumping light power used in the second optical amplification unit 30B is 36.5 dB.

As compared with the laser light source 1 according to the first embodiment including the one-stage optical amplification module 20 which is constituted by the first optical amplification medium 21 and second optical amplification medium 22 directly fusion-spliced together, in the case of the second laser light source 2 including the two-stage optical amplification module 30, there is scatter in the population inversion in the longitudinal direction of the second optical amplification medium 22, but the population inversion in the second optical amplification medium 22 is suppressed sufficiently low, so photodarkening can also be sufficiently suppressed. Therefore, also in the laser light source 2 according to the second embodiment, the same effect as that of the laser light source 1 of the first embodiment is obtained.

The invention is not limited to the above embodiments, various modifications being possible within the scope and spirit of the appended claims. For example, although in the aforesaid embodiments, forward pumping wherein the pumping light propagates in the same direction as the propagation direction of the light to be amplified was used, backward pumping wherein the pumping light propagates in the opposite direction to the propagation direction of the light to be amplified, may also be used.

As described above, in accordance with the present invention, photodarkening is effectively suppressed.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical amplification module, comprising:
   a first optical amplification unit which amplifies an incident light to be amplified and emits a first amplified light, said first optical amplification unit comprising: a first optical amplification medium having an optical waveguide region which is doped with a rare earth element, and having a light entrance end on which the light to be amplified is incident and a light exit end which emits a first amplified light that has been amplified inside said first optical amplification medium; a first pumping light source for outputting a first pumping light of a predetermined wavelength; and a first optical multiplexer for multiplexing the light to be amplified and the first pumping light, said multiplexer being disposed on the light entrance end side of said first optical amplification medium such that the first pumping light propagates from the light entrance end to the light exit end of said first amplification medium; and
   a second optical amplification unit which further amplifies the first amplified light emitted from said first optical amplification unit and emits a second amplified light, said second optical amplification unit comprising: a second optical amplification medium having an optical waveguide region which is doped with a rare earth element in a higher concentration than the rare earth concentration of said first optical amplification medium, and having a light entrance end on which the first amplified light is incident and a light exit end which emits a second amplified light that has been amplified inside said second optical amplification medium; a second pumping light source for outputting a second pumping light of different wavelength from the first pumping light; and a second optical multiplexer for multiplexing the first amplified light outputted from said first optical amplification medium and the first pumping light together with the second pumping light, said optical multiplexer being disposed between said first optical amplification medium and said second optical amplification medium, wherein:
   unsaturated absorption of said first optical amplification medium is not less than 60% of unsaturated absorption of said second optical amplification medium, and
   population inversion in said second optical amplification medium is not greater than 40%.

2. An optical amplification module according to claim 1, wherein the wavelength of said first pumping light is included within one of the 915 nm wavelength band and the 940 nm wavelength band, and
   wherein the wavelength of said second pumping light is included within the 974 nm wavelength band.

3. An optical amplification module according to claim 1, further comprising:
   a third optical amplification unit which further amplifies the second amplified light outputted from said second optical amplification unit, said third optical amplification unit comprising: a third optical amplification medium having an optical waveguide region which is doped with a rare earth element in a higher concentration than the rare earth concentration of said first optical amplification medium, and having a light entrance end on which the second amplified light is incident and a light exit end which emits a third amplified light that has been amplified inside said third optical amplification medium; a third pumping light source for outputting a third pumping light of different wavelength from the wavelength of the first pumping light; and a third optical multiplexer for multiplexing the second amplified light outputted from said second optical amplification medium, the first pumping light and the second pumping light together with the third pumping light, said optical multiplexer being disposed between said second optical amplification medium and said third optical amplification medium.

4. An optical amplification module according to claim 3, wherein the wavelength of said third pumping light is included within the 974 nm wavelength band.

5. A laser light source, comprising:
   a light source for outputting light to be amplified; and
   an optical amplification module according to claim 1, said optical amplification module amplifying the light to be amplified outputted from said light source.

6. An optical amplification module according to claim 1, wherein the rare earth concentration in each of said first and second optical amplification media is 2000 wt.ppm or more.

7. An optical amplification module according to claim 1, wherein:

the rare earth concentration of said first optical amplification medium is not greater than half of the rare earth concentration of said second optical amplification medium, and the wavelength of said first pumping light falls within the wavelength range of ±20 nm centered on a wavelength of 915 nm, and the wavelength of said second pumping light falls within the wavelength range of ±5 nm centered on a wavelength of 974 nm.

* * * * *